US010309224B2

(12) United States Patent
Marler et al.

(10) Patent No.: US 10,309,224 B2
(45) Date of Patent: Jun. 4, 2019

(54) SPLIT RING SPRING DAMPERS FOR GAS TURBINE ROTOR ASSEMBLIES

(71) Applicant: UNITED TECHNOLOGIES CORPORATION, Farmington, CT (US)

(72) Inventors: Mark E. Marler, Glastonbury, CT (US); Megan Phillips, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1007 days.

(21) Appl. No.: 14/715,217

(22) Filed: May 18, 2015

(65) Prior Publication Data

US 2016/0047270 A1 Feb. 18, 2016

Related U.S. Application Data

(60) Provisional application No. 62/004,362, filed on May 29, 2014.

(51) Int. Cl.

| | |
|---|---|
| ***F01D 5/10*** | (2006.01) |
| ***F01D 5/26*** | (2006.01) |
| ***F16F 15/12*** | (2006.01) |
| ***F01D 25/04*** | (2006.01) |

(52) U.S. Cl.

CPC ................. *F01D 5/10* (2013.01); *F01D 5/26* (2013.01); *F01D 25/04* (2013.01); *F05D 2250/14* (2013.01); *F05D 2260/96* (2013.01)

(58) Field of Classification Search

CPC ............. F05D 2260/96; F05D 2260/37; F05D 2230/60; F05D 2240/55; F05D 2250/14; F16F 15/129; F16F 15/121; F16F 15/1211; F16F 15/1217; F16F 15/124; F16F 15/14; F16F 15/1414; F16F 15/126; F16F 15/1421; F16F 15/1428; F01D 5/10; F01D 5/02; F01D 5/16; F01D 5/26; F01D 25/04; F01D 25/06; F01D 25/164; F16B 21/18; Y10T 25/5363; Y10T 464/50

See application file for complete search history.

(56) References Cited

U.S. PATENT DOCUMENTS 3,199,181 A * 8/1965 Wurzel .................. B25B 27/20 29/229
3,589,475 A * 6/1971 Alford .................... F01D 11/02 188/381

(Continued)

FOREIGN PATENT DOCUMENTS

| | | | | |
|---|---|---|---|---|
| DE | 4109481 A1 * | 10/1992 | ............ | F16B 21/183 |
| FR | 2888876 A1 * | 1/2007 | ............... | F01D 5/10 |
| GB | 759943 A * | 10/1956 | ............ | F16B 21/183 |

*Primary Examiner* — Logan Kraft
*Assistant Examiner* — Joshua R Beebe
(74) *Attorney, Agent, or Firm* — Cantor Colburn LLP

(57) ABSTRACT

A spring damper includes a split ring body. The split ring body defines a center and a circular gap separating opposed first and second end portions of the split ring body. The first and second end portions are connected by a split ring body segment that is evenly spaced from the center. At least one of the first and second end portions is unevenly spaced from the center in relation to the segment that is evenly spaced with respect to the center.

16 Claims, 4 Drawing Sheets

(56) References Cited

U.S. PATENT DOCUMENTS

| | | | | |
|---|---|---|---|---|
| 5,386,894 | A * | 2/1995 | Barca | B23D 47/005<br>188/379 |
| 2009/0214347 | A1 * | 8/2009 | Cloarec | F01D 5/10<br>416/204 A |

* cited by examiner

SPLIT RING SPRING DAMPERS FOR GAS TURBINE ROTOR ASSEMBLIES

CROSS-REFERENCE TO RELATED APPLICATION

This application claims the benefit of priority under 35 U.S.C. § 119(e) to U.S. Provisional Application No. 62/004,362, filed May 29, 2014, which is incorporated herein by reference in its entirety.

BACKGROUND OF THE INVENTION

1. Field of the Invention

The present disclosure relates to vibration damping, and more particularly to mechanical damping devices for gas turbine engine components.

2. Description of Related Art

Gas turbine engines ignite compressed air and fuel to create a flow of hot combustion gases that drive multiple stages of turbine blades. The turbine blades extract energy from the flow of hot combustion gases to drive a turbine rotor. The turbine rotor drives a fan to provide thrust and a compressor to provide a flow of compressed air. Disk covers coupled to the turbine blade stages form an inner portion of a gas path traversed by the hot combustion gases. These covers provide separation between the hot combustion gases traversing the turbine disk and portions of the disk not exposed to the combustion gases.

Turbine stage disk covers can be subject to vibrational forces and/or flutter due to fluid flow pulsation during engine operation. These forces can require damping, typically through cover geometry and/or material selection, or through use of a mechanical damper. Mechanical dampers function by absorbing vibrational energy through mechanical contact with the damped structure to reduce the response of the damped structure from vibrational forces and/or flutter otherwise resulting from fluid flow passed the structure during engine operation.

Such conventional methods and systems have generally been considered satisfactory for their intended purpose. However, there is still a need in the art for improved mechanical damper. There is also a need for improved dampers with increased ability to withstand engine transportation loads. The present disclosure provides a solution for this need.

SUMMARY OF THE INVENTION

A spring damper includes a split ring body. The split ring body defines a center and a circular gap separating opposed first and second end portions of the split ring body. The first and second end portions are connected by an evenly spaced segment of the split ring body that is evenly spaced from the body center. At least one of the first and second end portions is unevenly spaced from the center in relation to the evenly spaced segment.

In certain embodiments, the evenly spaced segment can be offset from the center by a uniform radius. An end of the first end portion can be spaced radially outward from the center in relation to the evenly spaced segment. An end of the second end portion can be spaced radially outward from the center in relation to the evenly spaced segment. It is contemplated both ends of the end portions can be spaced radially outward from the center in relation to the evenly spaced segment.

In accordance with certain embodiments the split ring body can have an arcuate shape, such as a circular or elliptical shape for example. The evenly spaced segment can span an arc extending about 270 degrees around the center of the split ring body. At least one of the first and second end portions can transition to a larger radius of curvature relative to the evenly spaced segment within a span of about 0 degrees to 180 degrees of the split ring body.

It is also contemplated that in certain embodiments the spring damper can have an unloaded configuration wherein the end portion ends extend radially outward in relation to the evenly spaced segment and define an unloaded gap width therebetween. The spring damper can also have a statically loaded configuration wherein the end portion ends are spaced radially inward in relation to the evenly spaced segment and define a statically loaded gap width therebetween. The statically loaded gap width can be less than the unloaded gap width.

It is further contemplated that the spring damper can have a dynamically loaded configuration wherein end portion ends and the evenly spaced segment are equidistantly spaced about the center. End portion ends can be separated by a gap with a dynamically loaded gap width therebetween that is greater than the statically loaded gap width. The dynamically loaded gap width can also be less than the unloaded gap width.

A rotor stage includes a disk, a disk cover and a spring damper as described above. The disk cover is connected to the disk and the spring damper is connected to the disk cover. The disk cover imparts a preload into the split ring body by exerting preload forces on the first and second end portions of the spring damper such that the first and second end portions are spaced radially inward toward the center by at least the same distance as the evenly spaced segment. In accordance with certain embodiments the preload forces can be such that ends of the end portions are spaced radially inward toward to the center in relation to the evenly spaced segment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
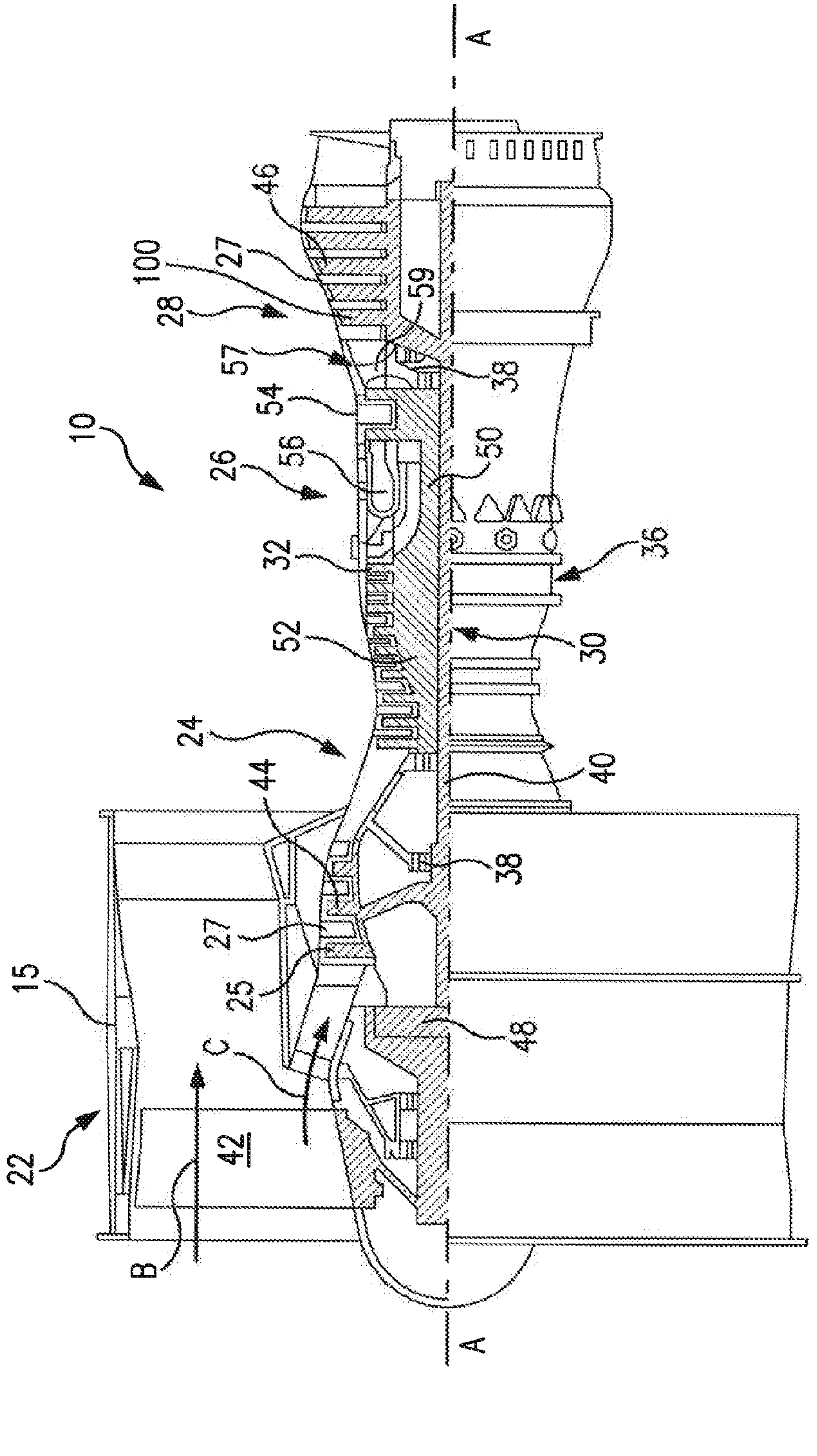
FIG. 1 is a schematic, partial cross-sectional side view of an exemplary embodiment of a gas turbine engine constructed in accordance with the present disclosure, showing a rotor stage.

Reference will now be made to the drawings wherein like reference numerals identify similar structural features or aspects of the subject disclosure. For purposes of explanation and illustration, and not limitation, a partial view of an exemplary embodiment of a gas turbine engine including the spring damper in accordance with the disclosure is shown in FIG. 1 and is designated generally by reference character 10. Other embodiments of gas turbine engines and spring dampers for gas turbine engines in accordance with the disclosure, or aspects thereof, are provided in FIGS. 2-6, as will be described. Embodiments of spring dampers described herein can be used for damping components in aircraft gas turbine engines, terrestrial gas turbines, and marine gas turbines.

As used herein, the term dynamically loaded refers loading imposed on engine components when engine rotary components are rotating during engine operation. Transportation load refers to loads exerted on engine rotary components when the rotary components are not rotating. This includes time intervals during which the engine is not operating, such as when the engine or engine subassembly is being transported as a spare for example.

FIG. 1 schematically illustrates gas turbine engine 10. Gas turbine engine 10 as disclosed herein as a two-spool turbofan that generally incorporates a fan section 22, a compressor section 24, a combustor section 26 and a turbine section 28. Fan section 22 drives air along a bypass flow path B in a bypass duct defined within a nacelle 15, while the compressor section 24 drives air along a core flow path C for compression and communication into combustor section 26 followed by expansion through turbine section 28. Although depicted as a two-spool turbofan gas turbine engine in the disclosed non-limiting embodiment, it should be understood that the concepts described herein are not limited to use with two-spool turbofans as the teachings may be applied to other types of turbofan engines including three-spool engine architectures.

Exemplary gas turbine engine 10 generally includes a low-speed spool 30 and high-speed spool 32 mounted for rotation about an engine rotational axis A relative to an engine static structure 36 via several bearing systems 38. It should be understood that various bearing systems 38 at various locations may alternatively or additionally be provided, and the location bearing systems 38 may be varied as appropriate to the application.

Low-speed spool 30 generally includes an inner shaft 40 that interconnects a fan 42, a first (or low-pressure) compressor 44 and a first (or low-pressure) turbine 46. Inner shaft 40 is connected to fan 42 through a speed change mechanism, which in exemplary gas turbine engine 10 is illustrated as a geared architecture 48 to drive fan 42 at a lower speed than low-speed spool 30. High-speed spool 32 includes an outer shaft 50 that interconnects a second (or high-pressure) compressor 52 and a second (or high-pressure) turbine 54. A combustor 56 is arranged in exemplary gas turbine engine 10 between high-pressure compressor 52 and high-pressure turbine 54. A mid-turbine frame 57 of engine static structure 36 is arranged generally between high-pressure turbine 54 and low-pressure turbine 46. Mid-turbine frame 57 further supports bearing systems 38 in turbine section 28. Inner shaft 40 and outer shaft 50 are concentric and rotate via bearing systems 38 about engine central rotation axis A which is collinear with their rotation axes.

Core airflow is compressed by low-pressure compressor 44, further compressed by high-pressure compressor 52, mixed and burned with fuel in combustor 56, and expanded over high-pressure turbine 54 and low-pressure turbine 46. Mid-turbine frame 57 includes airfoils 59, which are in core airflow path C. Low-pressure turbine 46 and high-pressure turbine 54 rotationally drive respective low-speed spool 30 and high-speed spool 32 in response to the expansion. It will be appreciated that each of the positions of fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear section 48. Each of compressor section 24 and turbine section 28 may include a rotor stage 100.

Figure 2:
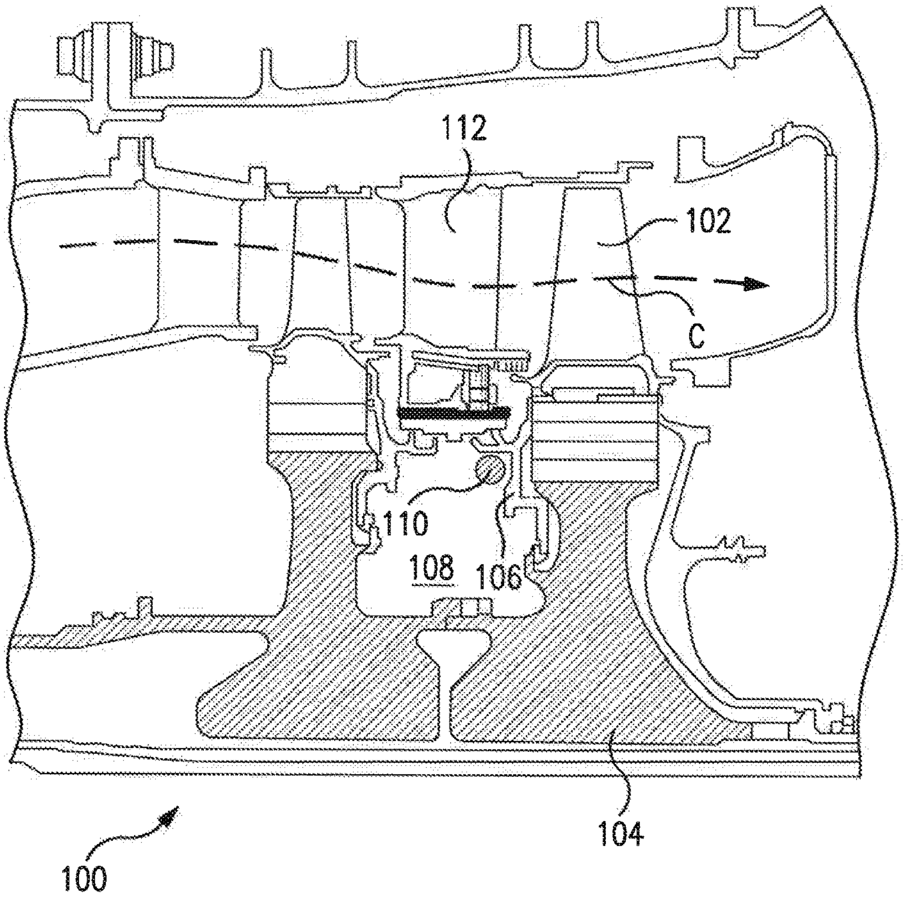
FIG. 2 is a schematic, cross-sectional side view of a portion of the gas turbine engine of FIG. 1, showing the rotor stage and a disk, a disk cover, and a spring damper of the rotor stage.

With reference to FIG. 2, rotor stage 100 is shown. As will be appreciated by those skilled in the art, successive vanes 112 and rotor stages 100 are arranged serially along core flow path C. Vane 112 directs core airflow C as it traverses gas turbine engine 10 and toward downstream blade 102. Downstream blade 102 extracts energy in the form of pressure from the core airflow C for application of rotational force to rotor disk 100 about engine axis A (shown in FIG. 1).

Rotor stage 100 defines an interior cavity 108 and includes blade 102, a rotor disk 104, a disk cover 106, and a spring damper 110. Blade 102 has airfoil portion disposed within core flow path C and a root portion seated within rotor disk 104. Disk cover 106 connects on its downstream side to rotor disk 104 by seating in a pocket defined on a forward face of rotor disk 104. Disk cover 106 defines on its upstream side knife-edges that sealably couple with vane 112. This separates hot gases traversing core gas path C from interior cavity 108 and allows for rotation of rotor disk 100 in relation to static engine components, e.g. vane 112.

Spring damper 110 is disposed within interior cavity 108 and is attached to disk cover 106 such that such that blade 102, rotor disk 104, disk cover 106, and spring damper 110 rotate with one of low-speed spool 30 (shown in FIG. 1) and high-speed spool 32 (shown in FIG. 1). As will be appreciated by those skilled in the art, disk cover 106 can be subject to forces during operation that can displace disk cover 106, induce fatigue damage, or both, and therefore requires damping. Spring damper 110 is in intimate mechanical contact with disk cover 106 and provides a predetermined damping effect to disk cover 106 to counteract these forces.

Figure 3:
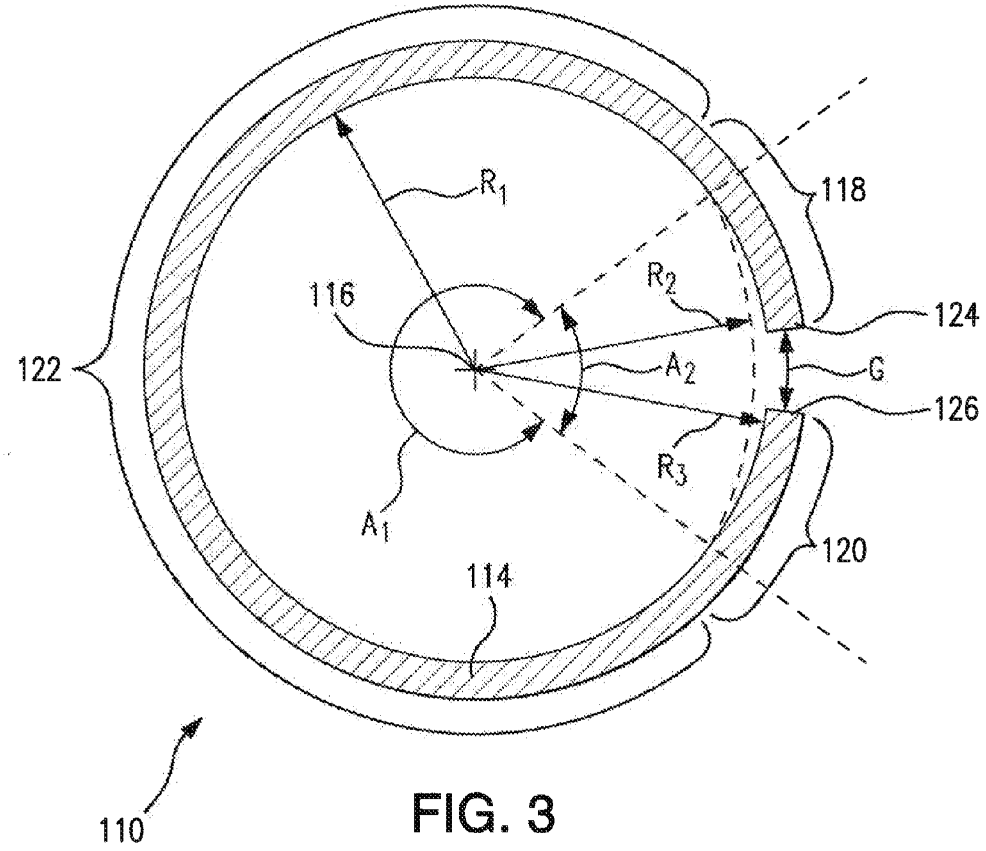
FIG. 3 is a schematic axial view of the spring damper of FIG. 2, showing an evenly spaced segment and end portions of the spring damper.

With reference to FIG. 3, spring damper 110 is shown. Spring damper 110 has a split ring body 114. Split ring body 114 defines a center 116 and a circular gap G separating a first end portion 118 and an opposed second end portion 120. An evenly spaced segment 122 of split ring body 114 is evenly spaced with respect to center 116 and couples first end portion 118 to second end portion 120. At least one of first end portion 118 and second end portion 120 is unevenly spaced from center 116 in relation to evenly spaced segment 122. In this respect, at least one of first end portion 118 and second end portion 120 defines a curvilinear segment with a transition demarcated by a line tangent to an outer surface of evenly spaced segment 122. As illustrated in FIG. 3, in certain embodiments, both first end portion 118 and second end portion 120 are unevenly spaced from center 116 with respect to evenly spaced segment 122.

Evenly spaced body segment 122 spans a first angle $A_1$ in relation to center 116. First end portion 118, circular gap G, and second end portion 120 span a second angle $A_2$ in relation to the center 116. Evenly spaced segment 122 is offset from center 116 by a substantially uniform offset (radial) distance along an arc spanning between about 180 degrees to about 270 degrees. In the embodiment illustrated, the arc spanned by evenly spaced segment 122 is about 270 degrees. Although evenly spaced segment 122 is illustrated in FIG. 3 as a circular segment, it is to be understood that the shape and/or offset of spring damper 110 with respect to center 116 can be defined by a preload imposed by disk cover 106 (shown in FIG. 2) as well as static and/or dynamic load(s) imposed on split ring body 114.

Evenly spaced segment 122 is offset along by a first offset distance $R_1$ from center 116. An end 124 of first end portion 118 is offset from center 116 by a second offset distance $R_2$ from center 116. An end 126 of second end portion 120 is offset from center 116 by a third offset distance $R_3$ from center 116. Second offset distance $R_2$ and third offset distances $R_3$ are greater than first offset distance $R_1$ such that first end 124 and second 126 are unevenly spaced outward from center 116 with respect to the evenly spaced segment 122.

Figure 4:
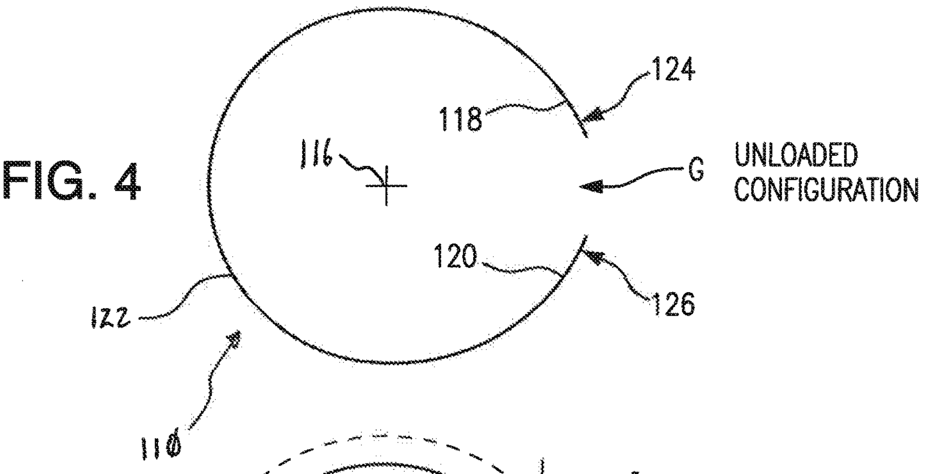
FIG. 4 is a schematic axial view of the spring damper of FIG. 3, showing the spring damper in an unloaded configuration.
Figure 5:
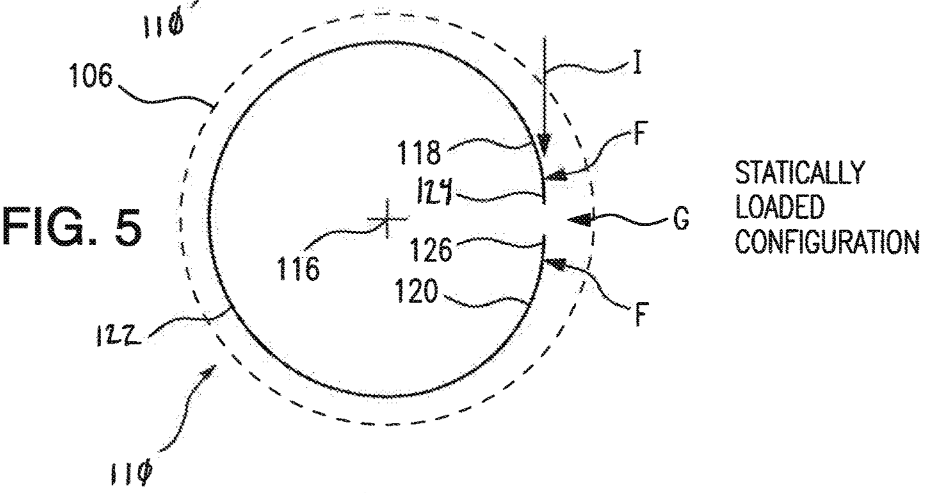
FIG. 5 is a schematic axial view of the spring damper of FIG. 3, showing the spring damper in a statically loaded configuration.
Figure 6:
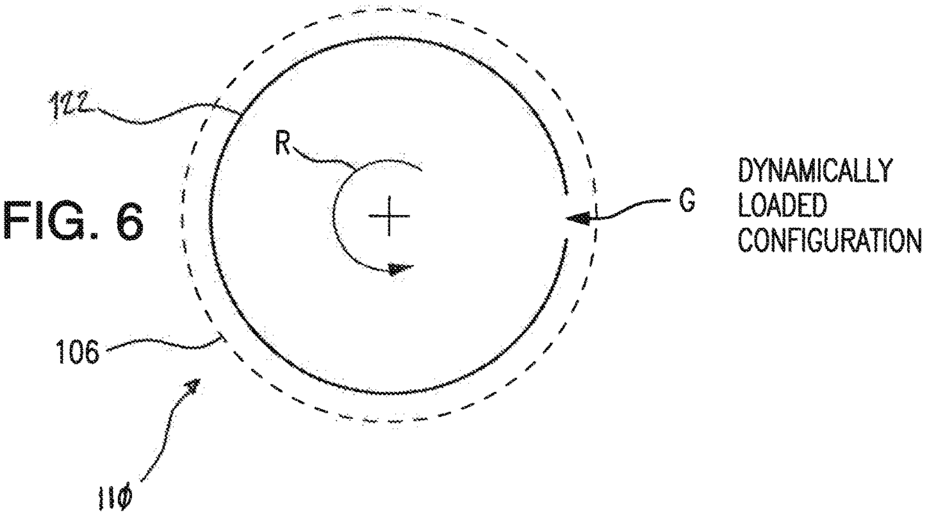
FIG. 6 is a schematic axial view of the spring damper of FIG. 3, showing the damper in a dynamically loaded configuration.

FIGS. 4-6 show exaggerated schematic views of spring damper 110 in an unloaded configuration, a statically loaded configuration, and a dynamically loaded configuration. In the unloaded configuration (shown in FIG. 4), spring damper 110 is in a free state wherein substantially no force is applied to spring damper 110. In the statically loaded configuration (shown in FIG. 5), disk cover 106 imposes preload forces F on first end portion 118 and second end portion 120. This orients first end portion 118 and second end portion 120 radially inwards, imparting a preload to the spring damper body and configuring spring damper 110 for resisting transportation loads. In the dynamically loaded configuration (shown in FIG. 6), rotation of the assembly from operation exerts additional centrifugal force on spring damper 110. This drives evenly spaced portion 122, first end portion 118, and second end portion 120 radially outward such that spring damper 110 has a substantially uniform radius. Arcuate segments defined by first end portion 118 and second end portion 122 as well as gap widths defined between first end 124 and second end 126 differ between each of the illustrated configurations.

With reference to FIG. 4, spring damper 110 is shown in the unloaded configuration. The unloaded configuration is a free state shape representative of an arrangement of spring damper 110 prior to installation into a circular device needing damping. Evenly spaced segment 122, first end portion 118 and second end portion 120 collectively define an elliptical shape with a minor cord extending between 0 degrees (at the top of FIG. 4) and 180 degrees (at bottom of FIG. 4) and a major cord extending between 90 degrees (at left hand side of FIG. 4), and the circumferential gap G. First end portion 118 and second end portion 120 define arcuate segments extending radially outwards from a circumference defined by an evenly spaced segment 122. First end 124 and second end 126 are unevenly spaced in a radially outward arrangement in relation to center 116 and with respect to evenly spaced segment 122.

With reference to FIG. 5, spring damper 110 is shown in a statically loaded configuration. The statically loaded configuration differs from the unloaded configuration in that spring damper 110 is installed in disk cover 106. Disk cover 106 imposes preload forces F that cause spring damper 110 to have a smaller diameter relative to the unloaded configuration and which impart a preload that keeps the spring damper in place when subjected to transportation loads. As illustrated, spring damper 110 is mechanically connected to disk cover 106 (shown in dashed outline) to form an engine subassembly. As illustrated, disk cover 106 applies a preloading force F on first end portion 118 and second end portion 120 that orients first end portion 118 and second end portion 120 toward one another. This more directly aligns first end 124 with second end 126. More direct alignment in turn causes tangentially oriented impacts, e.g. impact I, to cause first and second ends 124 and 126 to butt against one another, limiting reduction in the diameter of the part as a result of the event. This makes it more likely that spring damper 110 returns to its intended location following the event than split ring bodies with ends that overlay one another for a given transportation load.

With reference to FIG. 6, spring damper 110 is shown in a dynamically loaded configuration. The dynamically loaded configuration is similar to the statically loaded configuration with the addition of centrifugal forces associated with engine rotation R. Engine rotation R urges evenly spaced segment 122, first end portion 124, and second end portion 126 radially outward, further changing the arcuate shape of first end portion 124 and second end portion 126 and causing circumferential gap G to increase in width. As illustrated, width of circumferential gap G is wider in the dynamically loaded configuration than in the statically loaded configuration. Width of circumferential gap G is smaller than the width of circumferential gap G in the unloaded configuration.

As will also be appreciated by those skilled in the art, certain types of gas turbine engines and engine subassemblies can be subject to transportation loads while in a non-operating state. Transportation loads can exert forces on engine and/or engine subassembly sufficient to dislocate some types of damper from their intended location(s). Once dislocated, such dampers may be unable to provide an intended damping force (or effect) on engine structure requiring damping.

With respect to split ring dampers, Applicants have observed that transportation loads can sometimes be of sufficient magnitude to drive one end of a conventional split ring damper circumferentially past split ring body second end, causing one end of the damper to radially overlay another, and allowing the damper to dislocate from its intended position in relation to a structure requiring damping. Since dislocation can render the damper unable to provide its intended damping effect and/or potentially damage the engine operation, embodiments of the spring dampers described herein can provide greater resistance to dislocation due to tendency of the spring damper ends to remain in-plane with one another. This causes the opposed ends of the split ring body to butt against one another instead of overlap as result of the transportation load, making it more likely that the spring damper will return to its installed position rather than dislocate in response to the transportation load. This can be particularly advantageous when the transportation loads exert force tangent to the circumferential gap (as shown in FIG. 5).

Embodiments of spring dampers described herein have end portions that are unevenly spaced when in their unloaded configuration. When installed in an engine or engine subassembly, these ends align with one another due to preloading force applied by the disk cover to the spring damper. This aligned causes a force associated with a transportation load to drive the end portion ends into contact with one another instead of overlap, limiting end portion displacement and making it more likely that the spring damper returns to its intended position rather than become dislocated. In embodiments, the end portion spacing increases the preload in the gap region when installed in a rotor disk assembly and makes the spring damper more resistant to dislocation. It can also cause the gap to be smaller when installed in a disk cover, potentially increasing the likelihood that the spring damper will remain in its intended position when subjected to transportation loads. It can further enable more favorable stress distribution in the spring damper, potentially reducing creep or other effects that could otherwise result in loss of preload caused by larger free state (uninstalled) diameter.

In embodiments, the split ring damper body transitions to a larger radius of curvature in the region of the ring gap (i.e. the circular gap). In certain embodiments, the transition is in the 0 degree to 180 degree of the ring body. This can increase the preload in the gap region when the split ring body in the vicinity of the circumferential gap when installed. It can also cause the gap to be smaller when installed in a disk cover or other circular structure. This smaller gap can further increase the ability of the ring to remain in its intended location when subjected to transportation loads. Further, it can enable a more favorable stress distribution in the split ring body, potentially allowing for customization of the split ring body to prevent creep related loss in preload otherwise caused by a larger free state diameter.

The apparatus, systems and methods of the present disclosure, as described above and shown in the drawings, provide for spring dampers with superior properties including improved resistance to dislocation due to transportation loadings or impact. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A spring damper for use in a gas turbine engine, comprising:

a split ring body defining a center and a circular gap separating opposed first and second end portions of the split ring body, wherein the first and second end portions are located on a distal end of a respective one of a first and second segment, the first and second segments each being connected to each other by a segment of the split ring body that is evenly spaced from the center, wherein the segment extends along a substantially uniform offset distance along an arc spanning about 180 degrees to about 270 degrees, wherein at least one of the first and second end portions is unevenly spaced from the center in relation to the segment that is evenly spaced, wherein the spring damper has an unloaded configuration wherein ends of the first and second end portions extend radially outward in relation to the evenly spaced segment and are separated by an unloaded gap width and wherein the spring damper has a statically-loaded configuration wherein ends of the first and second end portions are spaced inwards in relation to the evenly spaced segment.

2. A damper as recited in claim 1, wherein an end of the first end portion is spaced radially outward from the center in relation to the evenly spaced segment.

3. A damper as recited in claim 1, wherein ends of the first and second end portions are spaced radially outward from the center in relation to the evenly spaced segment.

4. A damper as recited in claim 1, wherein the evenly spaced segment is offset from the center by a uniform radius.

5. A damper as recited in claim 1, wherein the split ring body has an elliptical shape.

6. A damper as recited in claim 1, wherein ends of the end portions are separated by a statically loaded gap with a statically loaded gap width, the statically loaded gap width being less than the unloaded gap width.

7. A damper as recited in claim 1, wherein the spring damper has a dynamically loaded configuration wherein ends of the first and second end portions and evenly spaced segment are equidistantly spaced in relation to the center.

8. A damper as recited in claim 7, wherein the ends of the first and second end portions are separated by a dynamically loaded gap with a dynamically loaded gap width, the dynamically loaded gap width being greater than the statically loaded gap width.

9. A damper as recited in claim 8, wherein the dynamically loaded gap width is less than the unloaded gap width.

10. A damper as recited in claim 1, wherein at least one of the first and second end portions transitions to a larger radius of curvature than the evenly spaced segment within a span of about 0 degrees to 180 degrees of the split ring body.

11. A damper as recited in claim 1, wherein the evenly spaced segment spans an arc of 270 degrees about the center.

12. A gas turbine rotor stage, comprising:

a disk;

a disk cover connected to the disk; and a spring damper connected to the disk cover, including:

a split ring body defining a center and a circular gap separating opposed first and second end portions of the split ring body, wherein the first and second end portions are located on a distal end of a respective one of a first and second segment, the first and second segments each being connected to each other by a segment of the split ring body that is evenly spaced from the center, wherein the segment extends along a substantially uniform offset distance along an arc spanning about 180 degrees to about 270 degrees, wherein the disk cover imposes sufficient preload on the spring damper such that the first and second end portion segments are spaced radially inward in relation to the evenly spaced segment, and wherein the spring damper has an unloaded configuration wherein ends of the first and second end portions extend radially outward in relation to the evenly spaced segment and are separated by an unloaded gap width and wherein the spring damper has a statically-loaded configuration wherein ends of the first and second end portions are spaced inwards in relation to the evenly spaced segment.

13. A stage as recited in claim 12, wherein ends of the end portions are aligned such that a tangentially imposed force of the split ring body causes the ends to contact one another.

14. A stage as recited in claim 12, wherein the evenly spaced segment has a circular shape.

15. A gas turbine rotor stage, comprising:

a disk;

a disk cover connected to the disk; and a spring damper connected to the disk cover, including:

a split ring body defining a center and a circular gap separating opposed first and second end portions of the split ring body, wherein the first and second end portions are located on a distal end of a respective one of a first and second segment, the first and second segments each being connected to each other by a segment of the split ring body that is evenly spaced from the center, wherein the segment extends along a substantially uniform offset distance along an arc spanning about 180 degrees to about 270 degrees, wherein the disk cover imposes sufficient preload on the spring damper such that the first and second end portion segments are evenly spaced from the center in relation to the evenly spaced segment, and wherein the spring damper has an unloaded configuration wherein ends of the first and second end portions extend radially outward in relation to the evenly spaced segment and are separated by an unloaded gap width and wherein the spring damper has a statically-loaded configuration wherein ends of the first and second end portions are spaced inwards in relation to the evenly spaced segment.

16. A stage as recited in claim 15, wherein the split ring body has a circular shape.

* * * * *